UNITED STATES PATENT OFFICE.

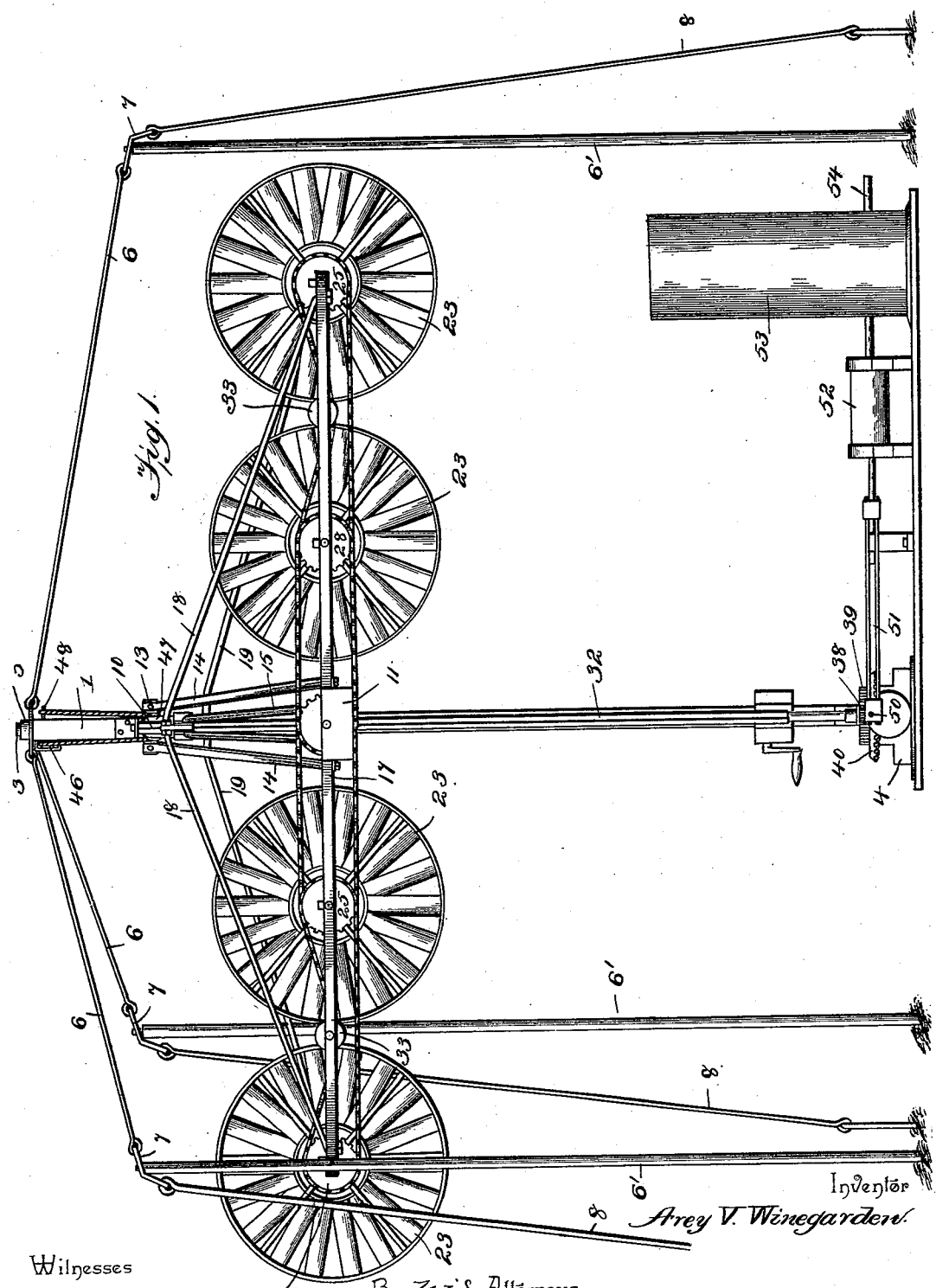

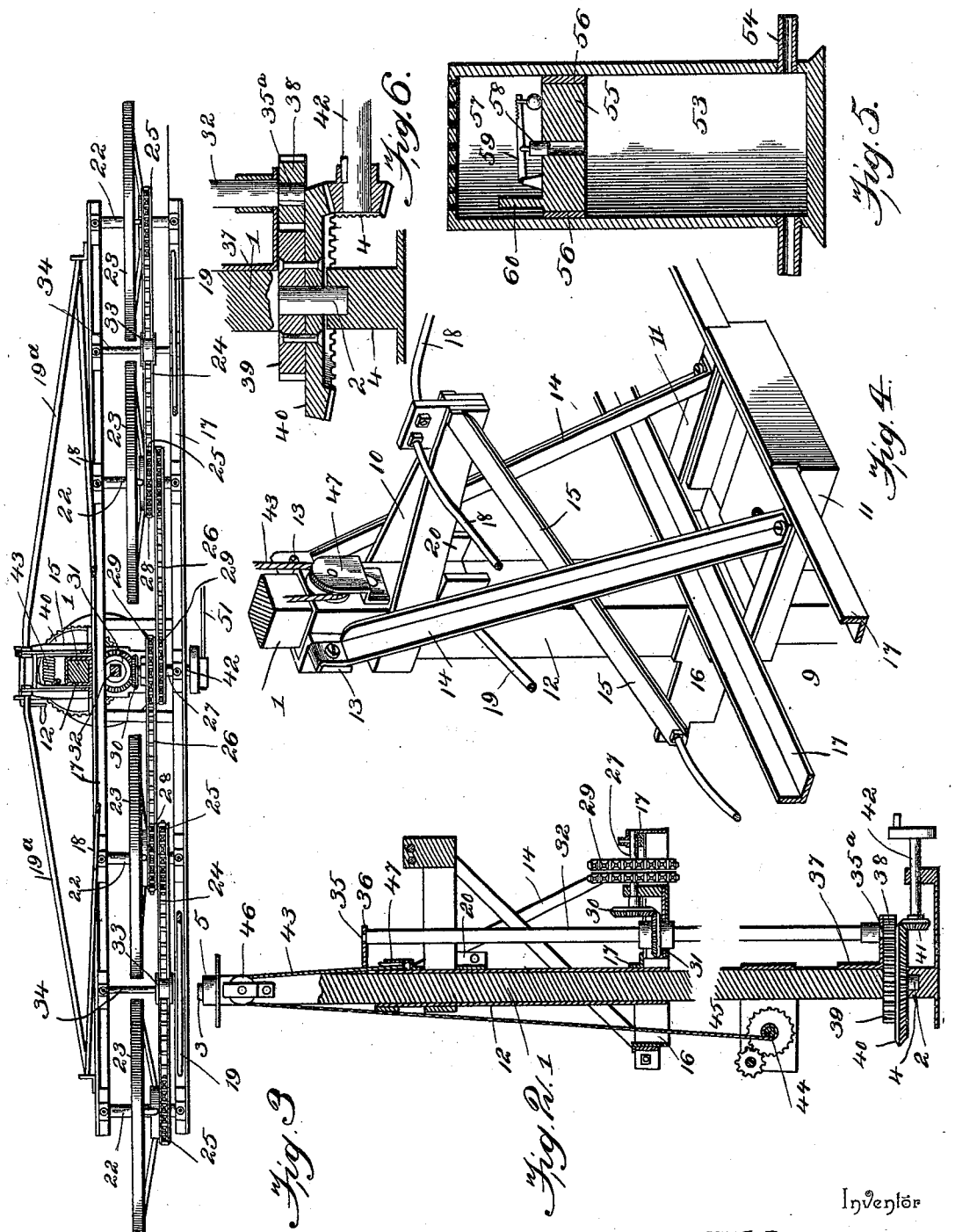

AREY V. WINEGARDEN, OF ANTHONY, KANSAS.

WINDMILL.

SPECIFICATION forming part of Letters Patent No. 518,300, dated April 17, 1894.

Application filed June 13, 1893. Serial No. 477,469. (No model.)

*To all whom it may concern:*

Be it known that I, AREY V. WINEGARDEN, a citizen of the United States, residing at Anthony, in the county of Harper and State of Kansas, have invented a new and useful Windmill, of which the following is a specification.

The invention relates to improvements in wind mills.

The object of the present invention is to improve the construction of wind mills, and to provide a simple and comparatively inexpensive one, which may be readily increased to afford the desired power, and which will enable motion to be readily communicated to any desired mechanism.

A further object of the invention is to provide a wind mill in which the wind wheels may be readily accessible, and which may be readily lowered to the ground to prevent the wind mill from being injured or racked by heavy storms.

Another object of the invention is to dispense with the vane usually employed for holding a wind wheel into the wind, and to provide a wind mill in which the wheel or wheels employed will always be in the wind.

The invention consists in the construction and novel combination and arrangement of parts hereinafter fully described, illustrated in the accompanying drawings and pointed out in the claims hereto appended.

In the drawings—Figure 1 is an elevation of a wind mill constructed in accordance with this invention. Fig. 2 is a vertical sectional view of the same. Fig. 3 is a horizontal sectional view. Fig. 4 is a detail perspective view of a portion of the horizontal frame and the vertical standard, and illustrating the means for slidingly mounting the former on the latter. Fig. 5 is a vertical sectional view of the storage cylinder. Fig. 6 is a detail sectional view of the lower gearing.

Like numerals of reference indicate corresponding parts in all the figures of the drawings.

1 designates a vertically disposed rotatable standard of square or other polygonal shape in cross-section, and provided at its ends with journals 2 and 3; the lower journal 2 is stepped in a bearing opening or socket of a block 4; and the upper journal is journaled in a central opening of a circular plate or head 5, to which are connected guide rods 6 extending to the upper ends of uprights 6', and connected by plates 7 with guide rods 8. The plate 7 is provided with an opening to receive the upper end of its upright 6', and is provided at its ends with perforations into which are linked eyes of the adjacent ends of the guide rods 6 and 8, and the lower end of the guide rod 8 is suitably anchored beyond the adjacent upright. By this construction the rotatable standard 1 is firmly supported in an upright position.

The rotatable standard has slidingly mounted on it a horizontal frame 9, which is connected with the standard by upper and lower brackets 10 and 11, and a guide sleeve 12 provided with laterally extending lugs, 13 and connected with the lower bracket 11 by inclined braces 14, having their lower ends secured to the lower bracket 11. The upper bracket 10 has an inner portion conforming to the configuration of the standard 1 and outwardly extending sides, which are connected by inclined braces 15 with a rectangular clip 16 of the lower bracket. The upper and lower brackets are secured to, and are carried by the guiding sleeve 12, which is slidingly mounted on the standard 1, and the crossed braces 14 and 15 support the frame 9 in a horizontal position.

The frame 9 is composed of parallel side bars 17, and is supported by inclined bracing rods 18 and 19 extending from the outer end of the upper bracket to the ends of the outer side bars 17 of the horizontal frame 9, and from the ends of the inner side bars 17 to lugs 20 of the sliding sleeve 12; and horizontal braces 19ª extend from the clip 16 of the lower bracket to the ends of the inner side bars of the horizontal frame 9. The inner ends of the said bracing rods are threaded and provided with nuts, and may be readily drawn to the desired tension.

The horizontal frame is arranged at one side of the center of the rotatable standard and extends from opposite sides thereof, and has journaled in suitable bearings transverse wind wheel shafts 22 carrying wind wheels 23, which may be of any desired number, and by increasing the number of wind wheels, the power of the wind mill may be increased to any desired extent.

In the accompanying drawings four wind wheels are shown arranged in pairs, and the wheels of each pair are connected by sprocket chains 24, which are arranged on sprocket wheels 25, which are secured to the wind wheel shafts, and which rotate with the wind wheels. The inner wind wheels of each pair are connected by sprocket chains 26 with a horizontal shaft 27 arranged transversely of the frame at the center thereof; the shafts of the inner wind wheels carry sprocket wheels 28 to receive the sprocket chains 26, and the shaft 27 has mounted on it a pair of sprocket wheels 29 to receive the inner extremities of the sprocket chains 26. By this arrangement of sprocket chains the power of the wind wheels is transmitted to the shaft 27, and the latter is connected by beveled gear wheels 30 and 31 with a vertical shaft 32 arranged parallel with and carried by the standard 1. The upper portions of the sprocket chains 24 pass under pulleys 33 of shafts 34, and are retained at the desired tension by having their upper portions depressed in this manner. The shaft 32 is squared, but may be of any other polygonal shape in cross-section; it has its ends reduced to form journals 35 and 35ª, which are arranged in bearing openings of upper and lower L-shaped bearing plates 36 and 37 secured to the standard 1. The beveled gear wheel 30 is arranged vertically, and is secured to the inner end of the central shaft 27 of the horizontal frame 9; and the gear wheel 31 is journaled on the lower bracket 11 and is provided with a central opening conforming to the configuration of and loosely receiving the shaft 32, and adapted to slide on the same when the horizontal frame slides on the standard. The lower end of the shaft 32 has secured to it a pinion 38, which meshes with a cog wheel 39; the cog wheel 39 is loosely mounted on the lower journal of the standard 1, and has rigidly connected with it a gear wheel 40, which rotates with the cog wheel 39, and which is provided on its lower face with teeth for engaging a pinion 41 of a drive shaft 42. The drive shaft 42 may be connected with any machinery to which the power of the wind mill is designed to be communicated as will be readily understood.

The sliding frame 9 is raised and lowered to enable it to be adjusted on the standard at the desired height to catch the wind, and to be lowered in case of a heavy wind or storm to prevent injury to the wind mill, by a hoisting rope 43, which has its lower end connected to and wound around the drum 44 of a windlass 45, and it passes over a pulley 46 at the top of the standard 1, and then under a pulley 47 of the sliding sleeve 12, and is secured to a hook 48 or other support at the top of the standard. The windlass frame is secured to the standard within easy reach and enables the sliding frame to be readily adjusted to the desired elevation, and affords convenient access to the wind wheels and the gearing, and it enables the wind wheels to be readily lowered in case of a heavy storm or high wind, to avoid injury to the wind mill.

By arranging the wind wheels at one side of the center of the standard 1, the wind operates to hold the wind wheels always facing it, thereby obviating the necessity of employing a vane for accomplishing this result, and greatly lessening the strain on the standard. The standard is adapted to rotate in its bearings to enable the wind wheels to shift with the wind, and the lower end of the shaft 32 is arranged to travel around the cog wheel 39, when the standard is rotated.

It will be seen that the wind mill is simple and comparatively inexpensive in construction, that it dispenses with a vane for holding the wind wheels into the wind, and that the latter may be readily raised and lowered to adjust them properly on the standard to receive the wind, and to shelter them in a storm or high wind, to avoid injury to the wind mill. It will also be apparent that motion may be readily transmitted from the wind mill to any machinery with the same facility as from the shaft of an engine.

Changes in the form, proportion and the minor details of construction may be resorted to without departing from the principle or sacrificing any of the advantages of this invention.

Although the wind mill may be connected directly to any mechanism or machinery designed to be run, yet it is desirable to render the motion of wind mills steady and continuous and devoid of sudden jerks which are incident to the ordinary construction of wind mills, and which are due in a great measure to the varying force of the wind; and it is also desirable to accumulate and store the power and to enable the same to be used when there is no wind, and thereby render a wind mill a positive and reliable engine. To accomplish this result the drive-shaft is provided with a crank disk 50 or other eccentric, and is connected by a pitman 51 with an air-pump 52, which communicates with a storage cylinder 53, in which compressed air is accumulated and stored for future use. The storage cylinder is provided with a distributing pipe 54, which may lead to and communicate with any suitable mechanism for utilizing the compressed fluid. Within the cylinder is arranged a weighted head 55 provided with a suitable gasket 56 to render it air-tight, and the tension of the compressed gas or air varies directly with the weight of the head 55, and by increasing the weight of the head the pressure of the air may be increased. The weighted head is adapted to be raised by the compressed air as it accumulates, and in order to prevent an explosion a safety valve 57 is provided. The safety valve consists of a valve pin or plug 58 arranged in an opening of the weighted head, and a lever 59 hinged at one end to a support and provided at its other end with an adjustable weight and connected intermediate of its ends with the upper end of the valve pin or plug. When the pressure within the storage cylinder becomes too great the valve pin or plug will be raised to allow the surplus pressure to blow off and is adapted to maintain a uniform pressure within the storage cylinder, and the adjustable weight enables this pressure to be varied. The weighted head is adapted to be lifted by the compressed air to a point within a short distance of the top of the cylinder, an upwardly projecting stop 60 being provided to limit the upward movement to prevent the safety valve from coming in contact with the top of the cylinder, and to allow sufficient space for the safety valve to operate. By this construction it will be seen that the power of wind mills may be rendered uniform and continuous, and that by storing the compressed air wind mills may be rendered positive and reliable engines, as the compressed air may be used as desired independent of the action of the wind.

What I claim is—

1. In a wind mill, the combination of a vertically disposed rotating standard, a vertically adjustable frame slidingly mounted thereon, wind wheels mounted on the frame, a vertical shaft journaled in suitable bearings of and rotating with the standard, and gearing connecting the wind wheels together and with the shaft, substantially as described.

2. In a wind mill, the combination of a vertically disposed rotating standard, a horizontal frame mounted on the standard, wind wheels carried by the frame, a vertical shaft journaled in suitable bearings of the standard, gearing connecting the wind wheels with the shaft, a pinion secured to and carried by the vertical shaft, a cog wheel loosely journaled on the standard and meshing with the pinion of the vertical shaft, and gearing for transmitting motion from the cog wheel, substantially as described.

3. In a wind mill, the combination of a vertically disposed rotating standard, a horizontal frame mounted on the standard, wind wheels carried by the frame, a vertical shaft journaled in suitable bearings of the standard, gearing connecting the wind wheels with the shaft, a pinion secured to and carried by the vertical shaft, a cog wheel loosely journaled on the standard and meshing with the pinion of the vertical shaft, a gear wheel secured to and rotating with the cog wheel, a drive shaft, and a pinion mounted on the drive shaft and meshing with the gear wheel, substantially as described.

4. In a wind mill, the combination of a vertically-disposed rotatable standard, a sliding frame mounted on the standard, a wind wheel mounted on the frame, gearing for transmitting motion from the wind wheel, and a hoisting rope for raising and lowering the sliding frame, substantially as described.

5. In a wind mill, the combination of a rotating standard polygonal in cross-section, a vertically movable frame slidingly mounted thereon and rotating therewith, a vertically disposed shaft journaled in suitable bearings of the standard and being polygonal in cross-section, a gear wheel journaled on the frame and having an opening receiving the vertical shaft and conforming to the configuration of the same, a transverse shaft journaled on the frame and carrying a gear wheel meshing with said gear wheel, wind wheels mounted on the frame, gearing for connecting the wind wheels with the transverse shaft, and means for raising and lowering the sliding frame, substantially as described.

6. In a wind mill, the combination of a rotating standard, a horizontal frame slidingly mounted thereon, and provided with a pulley, wind wheels mounted on the frame, gearing connected with the wind wheels for communicating motion therefrom, a pulley arranged at the top of the standard, a windlass arranged at the base of the same, and a hoisting rope having one end secured to the standard at the top thereof and passing under the pulley of the frame and over the pulley of the standard and extending down to and connected with the windlass, substantially as described.

7. In a wind mill, the combination of a rotating standard, a sleeve slidingly mounted on the same and provided at its top with lugs extending from opposite sides of the standard, upper and lower brackets secured to the sleeve, parallel side bars secured to the lower bracket and forming a frame, the crossed braces arranged at an inclination and extending from the lower bracket to the outer end of the upper bracket and to said lugs, the longitudinally disposed brace rods, wind wheels mounted on the frame, and gearing for transmitting motion from the wind wheels, substantially as described.

8. In a wind mill, the combination of a rotating standard, a vertically sliding frame mounted thereon, wind wheels mounted on the frame, gearing for transmitting motion from the wind wheel, a head having the upper end of the standard journaled in it, uprights, plates secured to the upper ends of the uprights, and brace rods 6 and 8 having their adjacent ends connected to said plates, the brace rods 6 extending from the uprights to said head, and the other brace rods extending downward from the uprights and designed to be anchored in the ground, substantially as described.

9. In a wind mill, the combination of a rotating standard, a vertical shaft polygonal in cross-section journaled in suitable bearings of the standard and carried by the same, a frame slidingly mounted on the standard, a transverse shaft journaled in suitable bearings of the frame, beveled gear wheels 30 and 31 connecting the transverse shaft with the vertical shaft, the gear wheel 31 having an opening loosely receiving the shaft and adapted to slide thereon with the movement of the frame, a cog wheel journaled on the standard and rotating independently thereof, a pinion fixed to the vertical shaft and meshing with the cog wheel, a gear wheel secured to the cog wheel, and a drive shaft carrying a pinion meshing with the last mentioned gear wheel, substantially as described.

10. In a wind mill, the combination of a rotating standard, a vertical shaft journaled thereon and carried thereby, a horizontal frame slidingly mounted on the standard, a transverse shaft journaled on the frame, beveled gearing connecting the transverse shaft and the vertical shaft, sprocket wheels mounted on the transverse shaft, wind wheels mounted on the frame and provided with sprocket wheels, sprocket chains connecting the wind wheels together and with the transverse shaft and arranged on said sprocket wheels, and pulleys located above and engaging the upper portions of the sprocket chains which connect the wind wheels, substantially as described.

In testimony that I claim the foregoing as my own I have hereto affixed my signature in the presence of two witnesses.

AREY V. WINEGARDEN.

Witnesses:
   JOHN H. SIGGERS,
   ARTHUR B. SEIBOLD.